Figure 1:
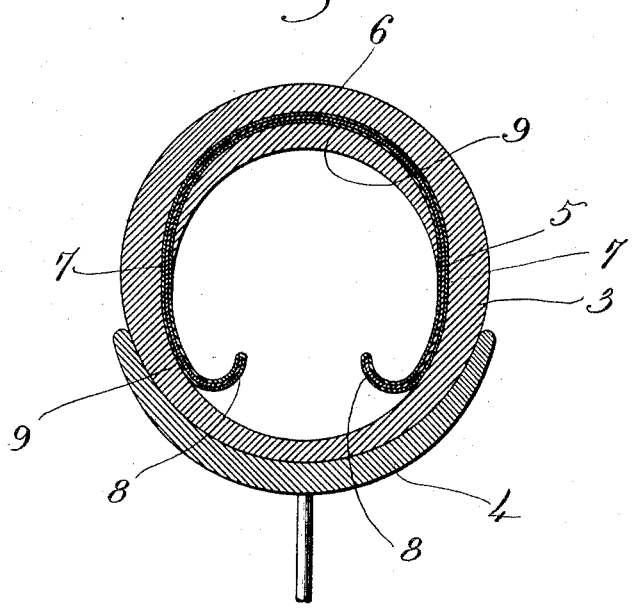

No. 775,824. PATENTED NOV. 22, 1904.
F. R. KEITH.
PNEUMATIC TIRE.
APPLICATION FILED FEB. 13, 1904.
NO MODEL.

Witnesses.
Thomas J. Drummond
Warren D. Olver

Inventor.
Frederick R. Keith,
by Crosby Gregory
Attys.

No. 775,824.

Patented November 22, 1904.

UNITED STATES PATENT OFFICE.

FREDERICK R. KEITH, OF RANDOLPH, MASSACHUSETTS.

PNEUMATIC TIRE.

SPECIFICATION forming part of Letters Patent No. 775,824, dated November 22, 1904.

Application filed February 13, 1904. Serial No. 193,402. (No model.)

*To all whom it may concern:*

Be it known that I, FREDERICK R. KEITH, a citizen of the United States, residing in Randolph, in the county of Norfolk and State of Massachusetts, have invented an Improvement in Pneumatic Tires, of which the following description, in connection with the accompanying drawings, is a specification, like numerals on the drawings representing like parts.

This invention has for its object to provide a non-puncturable pneumatic tire, said object being accomplished by incorporating in the tire a metallic shield or protector which is substantially U shape or parti-cylindrical in cross-section, the curved portion of which is situated at the tread portion of the tire and the sides of which extend toward the portion of the tire resting on the rim. The sides of the shield are such a shape that they extend to or partially overlie the rim of the wheel, and the edges of said shield are curved or rolled inwardly toward the center of the tire.

In the drawings I have shown two ways of embodying my invention.

Figure 2:
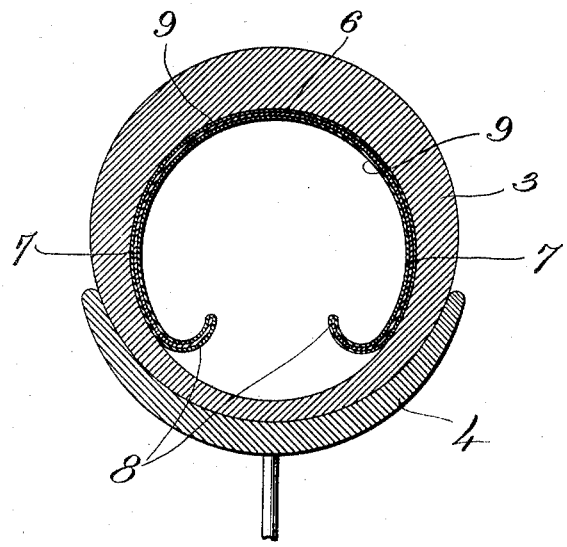

Figure 1 is a cross-section through the tire, showing one form of my invention; and Fig. 2 is a similar section showing a slightly different form thereof.

The tire, of rubber, fabric, or any other suitable material and made in any approved way, is designated at 3, and 4 designates the rim of the vehicle on which the tire is used. The metallic shield or protector is designated by 5 and is parti-circular or substantially U shape in cross-section, as seen in the drawings. This shield is a continuous annular member and extends clear around the tire. The central portion 6 of the shield when taken in cross-section is at the tread portion of the tire, and the two sides 7 thereof extend inwardly toward the rim, and preferably will be long enough to partially overlie the edge of the rim, as shown in the drawings. The edges of the sides are curved or rolled inwardly toward the center of the tire, as shown at 8. I prefer to completely cover the shield with a coating 9 of rubber before it is incorporated in the tire in the manufacturing of the latter.

In Fig. 1 the main portion 6 of the shield is embedded in the tread portion of the tire, this being accomplished during the usual process of manufacturing the tire. The sides 7 of the shield pass through the tire into the interior thereof and lie closely against the wall of the tire for some distance. In this form of the invention the shield may be provided with apertures which become filled with rubber of the tire, and thus hold said shield in place. Said shield is preferably made of some metal having the necessary resiliency, so that the sides 7 are held tightly against the side walls of the tire by the elasticity in the metal.

In Fig. 2 the shield is located entirely within the tire and is shaped to hug closely the inner walls thereof. I prefer to firmly secure the curved shield to the inner walls of the tire by cement or in any other suitable way. Since the shield is rubber-covered, it can be cemented or vulcanized to the tire, so as to form an integral part thereof, if desired. In such case it is impossible for any air to work its way in between the shield and the tire 3. Even if the shield is not made an integral part of the tire the rubber covering of said shield will form such a close intimate contact with the inside of the tire that no air can escape.

In case the air should escape from the tire, owing to a defective valve or any other reason, the shield serves to support the tire and prevent it from flattening, and, owing to its peculiar construction, at the same time it gives the necessary resiliency to the tire.

A tire constructed as above is especially adapted for use with heavy automobiles, because the resiliency due to the air-pressure is augmented by that due to the special shape of the resilient shield or protector.

Various changes in the form and arrangement of parts may be made without departing from the spirit and scope of the invention.

Having described my invention, what I claim as new, and desire to secure by Letters Patent, is—

1. A pneumatic tire having incorporated therewith a non-puncturable rubber-covered shield having a substantially U shape in cross-section, the body of the shield being situated at the tread portion of the tire, and the sides thereof being directed toward the rim of the wheel, and having their edges curved inwardly toward the center of the tire.

2. A pneumatic tire, having incorporated therewith a metallic rubber-covered shield of substantially U shape in cross-section, the body portion of the shield being situated at the tread portion of the tire, and the sides thereof lying within the air-space of the tire and against the inner walls thereof.

3. A tire having incorporated therewith a resilient metallic rubber-covered shield, having a substantially U shape in cross-section, the main portion of said shield being situated at the tread portion of the tire, and the sides thereof lying within the air-space of the tire and being held closely against the inner walls of the tire by the resiliency of the metal of the shield.

4. A pneumatic tire, having incorporated therewith a resilient rubber-covered metallic shield of substantially U shape in cross-section and provided with a coating of rubber, the main body of the shield being situated at the tread portion of the tire, and the sides thereof lying within the air-space of said tire and having their edges curved inwardly toward the center of the tire.

In testimony whereof I have signed my name to this specification in the presence of two subscribing witnesses.

FREDERICK R. KEITH.

Witnesses:
 Louis C. Smith,
 Geo. W. Gregory.